UNITED STATES PATENT OFFICE.

AUGUST SCHILLING, OF SAN FRANCISCO, CALIFORNIA.

ROASTED COFFEE-BERRIES.

SPECIFICATION forming part of Letters Patent No. 312,516, dated February 17, 1885.

Application filed August 14, 1884. (No specimens.)

*To all whom it may concern:*

Be it known that I, AUGUST SCHILLING, a citizen of the United States, residing at San Francisco, in the county of San Francisco and State of California, have invented new and useful Improvements in Roasted Coffee, of which the following is a specification.

The object of my invention is to bring out the full flavor and strength from the coffee-berry; and to that end it consists in incrusting the berry with an alkaline salt—for instance, such as bicarbonate of soda or borax—which becomes, as it were, a part of the berry, and when the latter is ground so intimately combines therewith that when the decoction is made therefrom the best flavor and strength of the berry are developed.

The method I have found most effective to accomplish my object is by dissolving a portion of the alkaline salt—for instance, bicarbonate of soda or borax—in water, in the proportion of about fourteen ounces to one gallon, and injecting this solution upon the berries while hot, the water evaporating by the heat and leaving the alkaline salt or borax upon the surface of the berry in the form of a grayish indurated scale or crust.

There may be other effective methods of applying alkaline salt or borax to the berry while hot, but that described is preferred.

I am aware that it is not new to coat roasted coffee with a glutinous or gelatinous matter for the purpose of retaining the aroma of the coffee, and combining a clarifying agent with the latter. Furthermore, I know that hominy has been prepared by impregnating hulled dry kernels of corn with an alkaline solution.

Having thus described my invention, what I claim is—

Roasted coffee-berries impregnated with an alkali, substantially as described.

In testimony whereof I have hereunto set my hand and seal in the presence of two subscribing witnesses.

AUGUST SCHILLING. [L. S.]

Witnesses:
JNO. L. BOONE,
R. D. MILNE.